(12) United States Patent
Ruehle et al.

(10) Patent No.: US 6,523,435 B2
(45) Date of Patent: Feb. 25, 2003

(54) DIFFERENTIAL GEAR CASING FOR A MOTOR VEHICLE

(75) Inventors: Guenter Ruehle, Loechgau (DE); Mark Mastroianni, Ludwigsburg, MI (US)

(73) Assignee: Getrag Getriebe-Und Zahnradfabrik Hermann Hagenmeyer GmbH & CIE, Ludwignsburg (DE)

( * ) Notice: Subject to any disclaimer, the term of this patent is extended or adjusted under 35 U.S.C. 154(b) by 0 days.

(21) Appl. No.: 09/832,713

(22) Filed: Apr. 11, 2001

(65) Prior Publication Data

US 2002/0002096 A1 Jan. 3, 2002

(30) Foreign Application Priority Data

Apr. 22, 2000 (DE) .......................................... 100 20 079

(51) Int. Cl.[7] .................................................. F01M 9/06
(52) U.S. Cl. .................... 74/606 R; 184/6.12; 184/11.1
(58) Field of Search ................................. 475/160, 230; 74/606 A, 606 R, 607; 184/6.12, 11.1, 11.2, 11.3, 13.1

(56) References Cited

U.S. PATENT DOCUMENTS

| | | | |
|---|---|---|---|
| 2,478,180 A | | 8/1949 | Buckendale |
| 3,118,515 A | | 1/1964 | Kraus et al. |
| 3,771,622 A | * | 11/1973 | Hyakumura ............. 180/24.09 |
| 4,699,230 A | | 10/1987 | Solleder et al. |
| 5,316,106 A | * | 5/1994 | Baedke et al. ........... 184/104.3 |
| 5,709,135 A | | 1/1998 | Baxter |
| 5,839,327 A | * | 11/1998 | Gage .......................... 184/11.1 |
| 6,135,241 A | * | 10/2000 | Ganguly et al. ........... 184/11.1 |
| 6,189,410 B1 | * | 2/2001 | Inoue ........................... 475/83 |
| 6,267,203 B1 | * | 7/2001 | Brissette et al. ........... 184/6.12 |

FOREIGN PATENT DOCUMENTS

| | | |
|---|---|---|
| DE | 18 01 917 A1 | 10/1968 |
| DE | 15 30 516 A | 10/1969 |
| DE | 25 08 948 A1 | 9/1975 |
| DE | 33 31 131 A1 | 3/1985 |
| DE | 34 42 584 C2 | 5/1986 |
| DE | 36 26 442 A1 | 2/1988 |
| DE | 196 24 002 C2 | 1/1998 |
| EP | 0 612 938 A | 8/1994 |
| FR | 2 020 198 A | 9/1969 |

* cited by examiner

Primary Examiner—Rodney H. Bonck
Assistant Examiner—Dennis Abdelnour
(74) Attorney, Agent, or Firm—Shook, Hardy, & Bacon L.L.P.

(57) ABSTRACT

A differential gear for a motor vehicle, comprises a casing, an input shaft, two output shafts, and a differential supported within the casing. The casing comprises two casing parts connected to each other along a separation plane which is oriented perpendicular with respect to the output shafts. At least one of the two casing parts comprises a projection which serves as a hollow carrier. The projection comprises an attachment spot for attaching the casing to a body of the motor vehicle, and is arranged above a rest oil level within the casing, wherein a retaining element is arranged within the casing at the entrance of the projection. The retaining element limiting the flow of oil which has been thrown into the projection, back into the casing.

9 Claims, 2 Drawing Sheets

DIFFERENTIAL GEAR CASING FOR A MOTOR VEHICLE

BACKGROUND OF THE INVENTION

1. Field of the Invention

The present invention relates to a differential gear for a motor vehicle, comprising a casing, an input shaft which can be coupled to a drive shaft of the motor vehicle, two output shafts which are arranged approximately perpendicular to the input shaft, each of said output shaft being couplable to a wheel of the motor vehicle, and a differential supported within the casing, wherein the casing comprises two casing parts, each of the casing parts comprising an attachment spot for attaching the casing to a body of the motor vehicle, said two casing parts being connected to each other along a separation plane, said separation plane being oriented with respect to the output shafts at an angle of more than 40 degrees.

2. Description of the Prior Art

A differential gear for motor vehicles, as mentioned above, is known for instance from L. R. Buckendale (U.S. Pat. No. 2,478,1809).

Differential gears of this type are typically used in motor vehicles having a conventional drive, i.e. the motor in the front and driven wheels at the rear. The differential gear is arranged between the two rear wheels of the motor vehicle.

The differential contained within the differential gear allows that the two rear wheels can have different speeds, e.g. when driving a turn.

The casing, in modern differential gears, includes typically a main casing and a casing lid, as is known for instance from A. Stephan et al. and from W. Naumann (German patent application publications No. 36 26 442 and 1 801 917, respectively). Attachment spots for attaching the casing to the body of the motor vehicle are typically provided at the lid, in some cases at the main casing, in some cases at both said casing parts.

In such modern differential gears, the main casing is usually provided at its front end with an opening for bearing the input shaft, and is provided at its rear end with a mounting opening which can be closed by means of the lid. The differential is mounted via the mounting opening.

The separation line between the main casing and the casing lid is usually flat and sealed by means of a seal. The seal can be a fluid, a flat or a shaped seal. The separation line of differential gears as are known from A. Stephan et al. is arranged within a separation plane which is essentially parallel to the output shafts.

In contrast thereto, the separation plane of the separation line of the differential gear of Buckendale is arranged approximately perpendicular to the output shafts.

In the above-mentioned German document 1 801 917 of Naumann, it is suggested to provide a differential gear having a main casing and a casing lid with a separation line parallel to the output shafts, wherein an oil collection space is provided within the lid. The oil collection space is open at its top end and is connected to the main space of the casing via an opening. During the operation of the differential gear, oil is thrown into the collection space. The opening is provided such that the main cavity is filled with oil up to a sufficient level, said level being such that losses due to splashing and thus the oil temperature do not rise excessively.

A similar concept is known from Ralph W. Baxter (U.S. Pat. No. 5,709,135). The casing of the differential gear of Baxter has two parts which are separated like a clam, having a horizontal separation line. A reservoir is provided in the lower casing part, in a region where the input shaft enters the casing. The oil is thrown into the reservoir by a ring gear of the differential. There is no disclosure on how the casing of the differential gear is attached to the body of the vehicle.

Finally, C. Alt (German patent publication 196 24 002) discloses a multispot support of a differential gear. The casing of the differential gear comprises a main casing and a casing lid, a separation plane being parallel to the output shafts. The main casing and the casing lid are provided with attachment spots at cantilever arms which project from the casing of the differential gear. The cantilever arms may be formed integrally with the casing of the differential gear, and may have a hollow cross section.

SUMMARY OF THE INVENTION

It is an object of the present invention to provide an improved differential gear for a motor vehicle.

It is another object of the present invention to provide a differential gear that can be easily attached.

It is another object of the present invention to provide a differential gear that can be easily manufactured.

Still a further object of the invention is to provide a differential gear having a good efficiency.

It is another object of the present invention to provide a differential gear having a simple construction.

These and other objects are achieved by a differential gear for a motor vehicle, comprising:

a casing, an input shaft which can be coupled to a drive shaft of the motor vehicle, two output shafts which are arranged approximately perpendicular to the input shaft and which can be connected to a respective wheel of the motor vehicle, and a differential supported within the casing, wherein the casing comprises two casing parts, each of the casing parts comprising an attachment spot for attaching the casing to a body of the motor vehicle, said two casing parts being connected to each other along a separation plane which is oriented at an angle of more than 40 degrees with respect to the output shafts, wherein at least one of said two casing parts comprises a projection which serves as a hollow carrier, said projection comprising an attachment spot for attaching the casing at its outside, said projection being arranged generally parallel with respect to the output shafts, and said projection being arranged above a rest oil level within the casing, wherein a retaining element is arranged within the casing at the entrance of the projection, said retaining element limiting the flow of oil back into the casing which has been thrown into the projection.

In view of the fact that the separation plane is arranged obliquely or perpendicular with respect to output shafts, a number of advantages arise. Particularly, the differential gear can be easily attached and the degree of freedom with respect to the shape of the casing is increased.

Such construction of the casing allows that the rigidity of the casing is constant in a direction around the axis of the output shafts, to the farest possible extent. Thus, the bias of the differential gear bearings in the casing can be made uniform around the circumference thereof.

A projection oriented in parallel to the output shafts can be easily realized due to the arrangement of the separation plane, even if the casing parts are molded.

In view of the fact that the projection is provided within the casing above the rest oil level, the projection can be used at high speeds for taking up oil which is thrown into the projection by the action of the differential which is supported within the casing, particularly by means of the ring gear thereof. Thus, the oil level decreases and the losses due to splashing are decreased, leading to less generation of heat. Thus, the efficiency is improved.

Due to the retaining element which is arranged at the entrance of the projection, any backflow of oil that has been thrown into the projection, into the casing is limited. Thus, only a limited amount of oil per time unit can flow back from the projection, wherein this oil amount is at high speeds lower than the amount of oil that is thrown per this time unit into the projection. Thus, at high speeds, oil is retained within the projection, i.e. within the cavity formed by the projection. At lower speed and high torque, the feeding effect is decreased and less amount of oil is retained within the projection. Thus, the entire oil volume can be used for lubrication and cooling purposes.

In view of the fact that an attachment spot for attaching the casing is provided at the outside of the projection, the projection serves as a hollow carrier. By using the projection as hollow carrier, a rigid connection of the attachment spot for attaching the casing is possible.

In a preferred embodiment, the separation plane is arranged approximately perpendicular to the output shafts.

Thereby, it is particularly easy to mount the differential in one of the two casing parts.

Further, it is preferred if the retaining element is a retaining sheet which is fixed at the entrance of the projection. Thereby, the retaining element can be manufactured and mounted at low cost.

In another preferred embodiment, the two casing parts are formfittingly connected to each other in a direction transverse to the orientation of the output shafts. Thereby, bearing forces of the differential are transferred via the form-fit connection (positive engagement), said connection being for instance a centering collar.

In addition, it is preferred if the two casing parts are sealed with respect to each other by means of an O-ring seal. Such a seal can be realized at low cost, particularly if the casing parts are form-fittingly connected to each other in a direction transverse to the orientation of the output shafts.

According to another preferred embodiment, the two casing parts are made of a light-weight material, preferably from a magnesium alloy or aluminum alloy.

In view of the fact that the casing rigidity is maintained essentially uniformly around the differential axis, i.e. around the axis of the output shafts, it is possible to use a light-weight material for the casing of the differential gear. The higher bias that is necessary to be imparted upon the differential bearings, is transferred uniformly to the circumference of these bearings.

It will be appreciated that the features mentioned above and the features that will be described below, cannot only be used in the respective quoted combination, but also in other combinations or, on their own, without departing from the scope of the present invention.

BRIEF DESCRIPTION OF THE DRAWINGS

Other objects, features and advantages of the present invention will become more apparent from the following detailed description of embodiments of the invention when read in conjunction with the accompanying drawings, in which.

DESCRIPTION OF THE PREFERRED EMBODIMENTS

Figure 1:
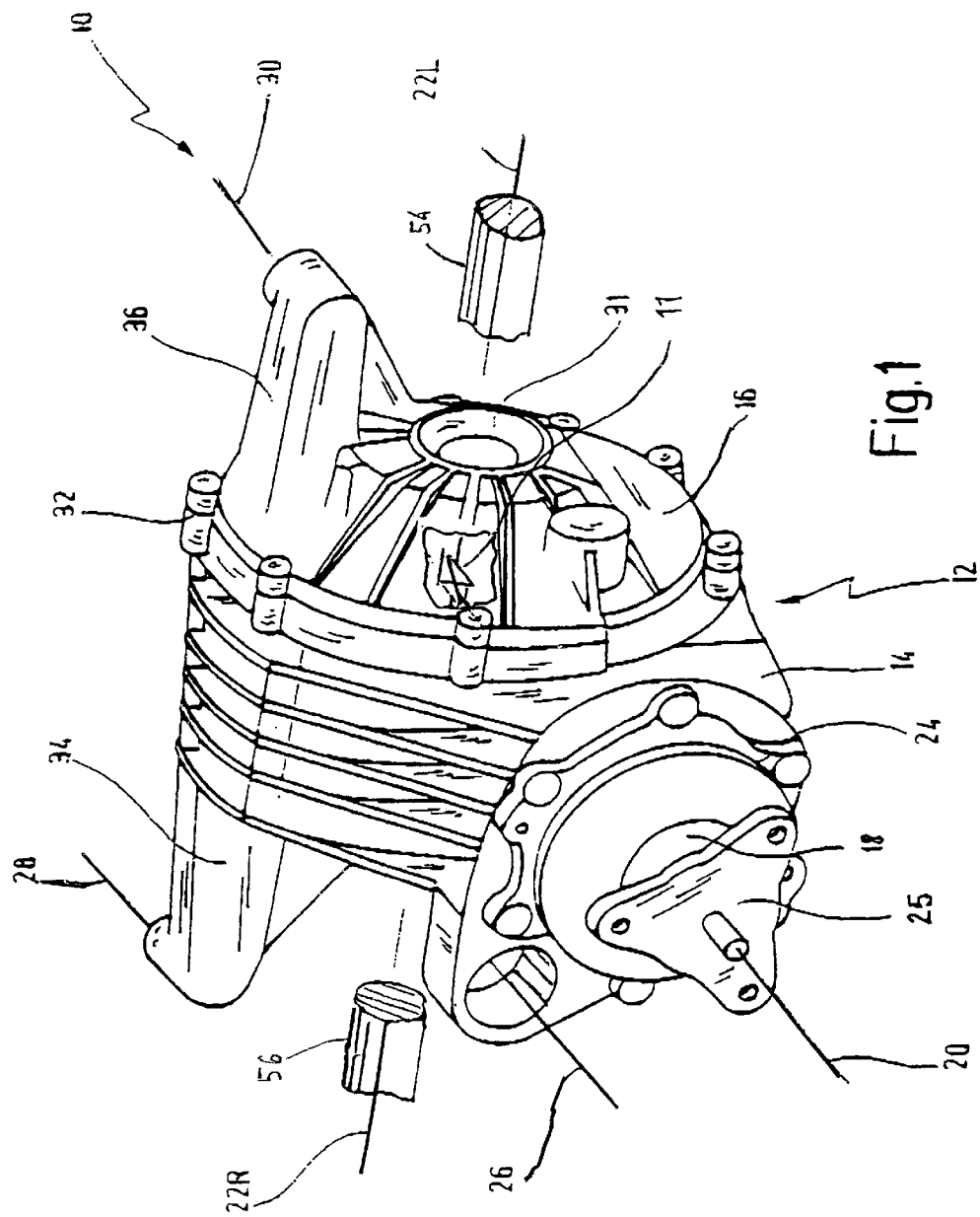
FIG. 1 is a perspective view of an inventive differential gear.

In FIG. 1, a differential gear in accordance with the invention is generally shown at 10.

The differential gear 10 includes a casing 12. The casing 12 consists essentially of a main casing 14 and a casing lid 16.

An input shaft 18 penetrates the main casing 14 and is arranged along an input shaft axis 20. The input shaft axis 20 is arranged approximately parallel to the longitudinal axis of a motor vehicle having a conventional drive.

The differential gear 10, further, comprises two output shafts 54, 56 which are arranged along the output shaft axis 22L for a left rear wheel, and an output shaft axis 22R for a right rear wheel of the motor vehicle. The output shaft axes 22L, 22R are arranged approximately perpendicular to the longitudinal axis of the vehicle.

The main casing 14 comprises a flange 24 for attaching a bearing casing for a drive spindle which can be connected to a cardan-shaft, via flange 25.

The main casing 14 comprises an attachment spot for attaching the casing 12 to a body of the motor vehicle, said attachment spot being arranged in the neighborhood of the flange 24. The attachment spot is arranged along an axis 26 parallel to the input shaft axis 20.

The main casing 14 comprises an additional attachment spot, the attachment axis 28 of which being also parallel to the input shaft 20.

The casing lid 16 comprises a third attachment spot, the axis 30 of which being also parallel to the input shaft axis 20.

The main casing 14 includes a differential which is labeled as 11 in FIG. 1. The function of such a differential is well known in the art and is thus not discussed in detail. The differential 11 includes a ring gear which mates with a pinon of the input shaft 18.

An output shaft for the right rear wheel (on axis 22R) penetrates an opening in the main casing 14. Said opening is not shown in FIG. 1. An output shaft for the left rear wheel (along axis 22L) penetrates an opposite opening 31 in the casing lid 16.

The casing lid 16 is, seen in longitudinal direction of the motor vehicle, attached at a side of the main casing 14 and closes a side opening of the main casing 14.

A separation plane 32 is defined between the main casing 14 and the casing lid 16. The separation plane 32 is arranged parallel to the input shaft axis 20 (and perpendicular to the output shaft axis 22).

Figure 3:
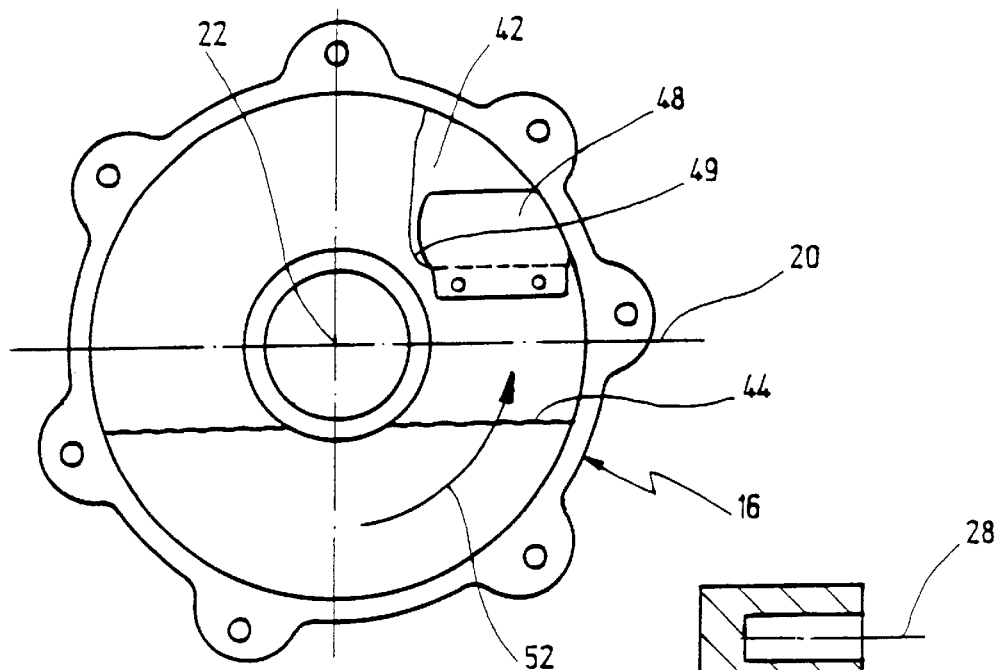
FIG. 3 is a vertical schematic inner view of a casing lid.

As can be seen in more detail in FIG. 3, the main casing 14 is integrally closed at its rear side (not shown in FIG. 1).

The differential 11 and the ring gear of the differential gear are mounted via the side opening of the main casing 14, making this step particular easy. Further, the setup of the differential gear is facilitating.

The differential 11 and the ring gear of the differential gear are mounted via the side opening of the main casing 14, making this step In view of the fact that the casing lid 16 is attached to a side of the main casing 14, the casing 12 as a whole has a consistent stiffness of rigidity around the output shaft axis 22. The output shaft axis 22 coincides with an axis of the differential 11, which differential axis is not shown in detail. Conclusively, the bias of the differential bearing at the circumference thereof can be made consistent. It will be appreciated that the differential 11 is mounted by means of at least one bearing at the main casing 14 and by means of at least one additional bearing at the casing lid 16.

In view of the uniform or constant stiffness of the casing 12 around the differential axis, the casing parts 14, 16 can be manufactured from a light-weight material, e.g. an aluminum alloy or a magnesium alloy.

Figure 2:
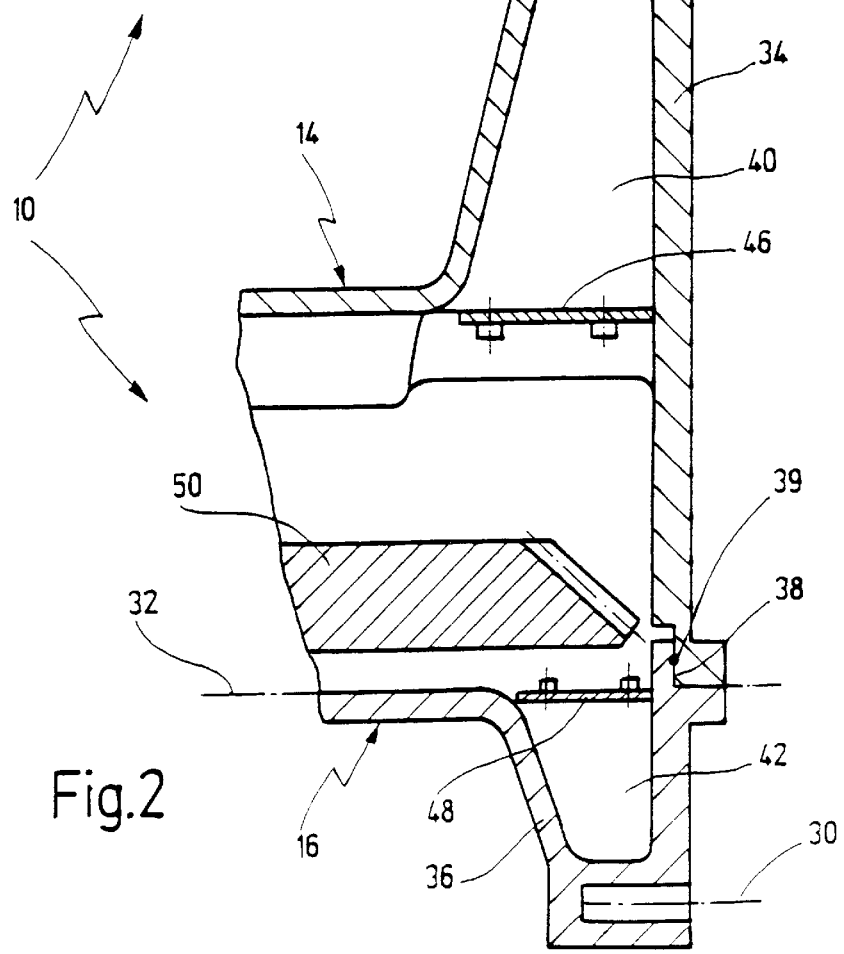
FIG. 2 is a schematic horizontal cross sectional view of a differential gear according to the present invention.

As is shown schematically also in FIGS. 2 and 3, the main casing 14 is provided with a hollow side projection 34 which extends parallel to the output shaft axis 22. Correspondingly, the casing lid 16 is provided with a hollow projection 36 which extends into the opposite direction.

The above-described attachment spots 28 and 30 are provided at the ends of the projections 34 and 36, respectively. The projections 34, 36 are formed integrally with the main casing 14 and the casing lid 16, respectively. The projections 34, 36 are rigid hollow carriers.

The length of the projections 34, 36 can be in the range of a quarter of the diameter of the casing lid 16, or can exceed such range, as is shown in FIG. 1 and in FIG. 2.

As can be seen in FIG. 2, each of the casing lid 16 and the main casing 14 is provided in the region of the separation line with a shoulder portion 38. The shoulder portions 38 establish a centering collar. Thus, bearing forces which are transmitted via the attachment spot 30 into the casing lid 16 are transferred in a form-fit manner onto the main casing 14 in a direction coinciding with the input shaft axis 20. The main casing 14 and the casing lid 16 are connected to each other by a plurality of bolts not shown in detail, which bolts extend and act in the direction of the output shaft axis 22.

An O-ring seal 39 seal is placed into the separation line, in the region of the shoulder portions 38 of the main casing 14 and the casing lid 16, respectively. The O-ring seal 39 seals the casing lid 16 against the main casing.

The inside portion of the projection 34 of the main casing 14 forms a cavity 40 which extends to the side of the main casing 14 (cf. FIG. 2). Correspondingly, the projection 36 of the casing lid 16 forms a side cavity 42.

As is shown in detail in FIG. 3, the cavities 40, 42 are arranged above a rest oil level 44. The rest oil level (or oil sump) 44 establishes if the differential gear 10 is inactive for a certain period of time.

A retaining sheet 48 (preferably a metal sheet) is fastened at the entrance of the cavity 42 by means of bolts. Correspondingly, a retaining sheet 46 is fastened at the entrance of the cavity 40.

As is shown in FIG. 3, the retaining sheet 48 covers approximately half of the entrance of cavity 42, starting from the bottom of the entrance. Only a small draining gap is provided.

The draining gap 49 could be replaced by holes within the retaining sheet 48. The retaining sheet 48 is provided at the entrance of the cavity 42 such that the entrance is covered up to a height which corresponds approximately to half of the height of the entrance.

The retaining sheet 46 is correspondingly arranged at the cavity 40.

As is schematically indicated in FIG. 2, a ring gear 50 of the differential is provided within the main casing 14. The projections 34, 36, and correspondingly the cavities 40, 42, are arranged such that rotating the ring gear 50 feeds oil from the oil sump in an upward direction (in the direction indicated at 52 in FIG. 3 during forward motion of the motor vehicle). A part of the oil is thrown over the retaining sheets 46 and 48 into the cavities 40, 42. The oil collects within the cavities 40, 42 and is retained therein, wherein the oil is drained therefrom at a comparatively low rate via the gap 49 (or another corresponding small opening).

At low vehicle speed and high torque transmitted, the amount of oil thrown per time unit into the cavities 40, 42 corresponds approximately to the amount of oil that can flow off via the gap 49 within the same time unit. Thus, at low speeds and high torque, the full amount of oil can be used for lubrication and cooling purposes.

At higher speeds of the ring gear 50, the amount of oil that is fed into the cavities 40, 42 per time unit is larger than the amount of oil that can be drained. Thereby, the oil level is reduced at high speeds of the ring gear 50, and splashing losses are reduced. Thus, the generation of heat is decreased and the efficiency increased.

The attachment spots 28, 30 of the differential gear 10 shown in FIG. 1 are arranged at a comparatively high level, such that the projections 34, 36 are arranged above the rest oil level 44.

It will be appreciated that additional projections can be provided above the level 44 in case that the attachment spots 28, 30 are provided at a height below the level 44, in order to reduce the oil sump level at high speeds of the ring gear 50.

The projections 34, 36 which extend in parallel to the output shaft axis 22, can be provided at the main casing 14 and the casing lid 16, respectively, at lower constructional efforts. In view of the fact that the separation plane 32 between the casing parts 14, 16 is arranged perpendicular to the output shaft axis 22, the casing parts 14, 16 can be manufactured by means of a simple molding process with a two-part mold, even though the casing parts 14, 16 are provided with the projections 34, 36.

We claim:

1. A differential gear for a motor vehicle, comprising:
   a casing,
   an input shaft which can be connected to a drive shaft of the motor vehicle,
   two output shafts which are arranged approximately perpendicular to the input shaft and which can be connected to a respective wheel of the motor vehicle, and
   a differential supported within the casing
   wherein the casing comprises two casing parts, each of the casing parts comprising an attachment spot for attaching the casing to a body of the motor vehicle, the casing parts being connected to each other along a separation plane which is arranged under an angle of more than 40 degrees with respect to the output shafts, wherein at least one of the two casing parts comprises a projection which serves as a hollow carrier, said projection comprising an attachment spot for attaching the casing to the body of the motor vehicle, said projection being arranged generally parallel with respect to the output shafts and offset from an axis of said output shafts, and said projection being arranged above a rest oil level within the casing, wherein a retaining element is arranged within the casing at the entrance of the projection, said retaining element limiting the flow of oil which has been thrown into the projection, back into the casing.

2. A differential gear in accordance with claim 1, wherein the separation plane is arranged approximately perpendicular to the output shafts.

3. A differential gear in accordance with claim 1, wherein the retaining element is a retaining sheet that is fastened to an entrance of the projection.

4. A differential gear in accordance with claim 1, wherein the two casing parts are form-fittingly connected to each other in a direction transverse to the direction of the output shafts.

5. A differential gear in accordance with claim 1, wherein the two casing parts are sealed to each other by means of an O-ring seal.

6. A differential gear in accordance with claim 1, wherein the two casing parts are manufactured from a light-weight material.

7. A differential gear in accordance with claim 6, wherein the two casing parts are manufactured from magnesium alloy.

8. A differential gear in accordance with claim 6, wherein the two casing parts are manufactured from an aluminum alloy.

9. A differential gear in accordance with claim 1, wherein each of the two casing parts comprises one projection, said two projections pointing in different directions.

* * * * *